May 29, 1956     E. E. KOHLS ET AL     2,747,845
HOUSEHOLD MIXER WITH AXIALLY YIELDABLE BEATERS
Filed Sept. 16, 1954     2 Sheets-Sheet 1
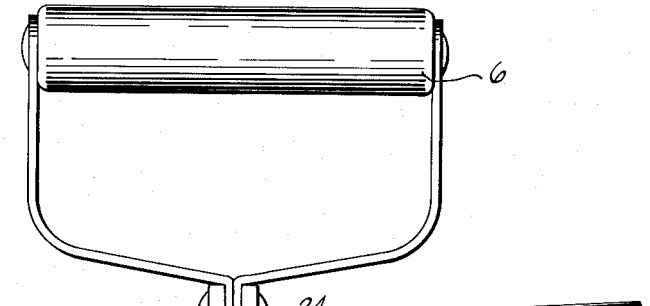
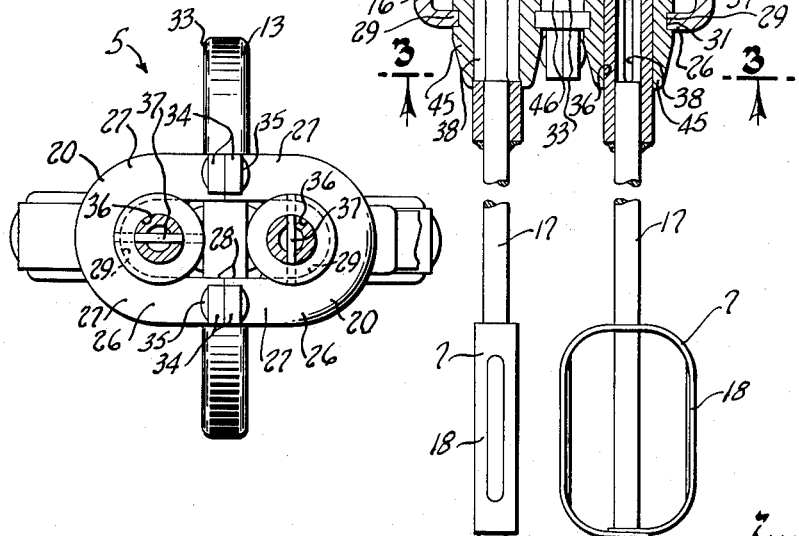

May 29, 1956     E. E. KOHLS ET AL     2,747,845
HOUSEHOLD MIXER WITH AXIALLY YIELDABLE BEATERS
Filed Sept. 16, 1954     2 Sheets-Sheet 2
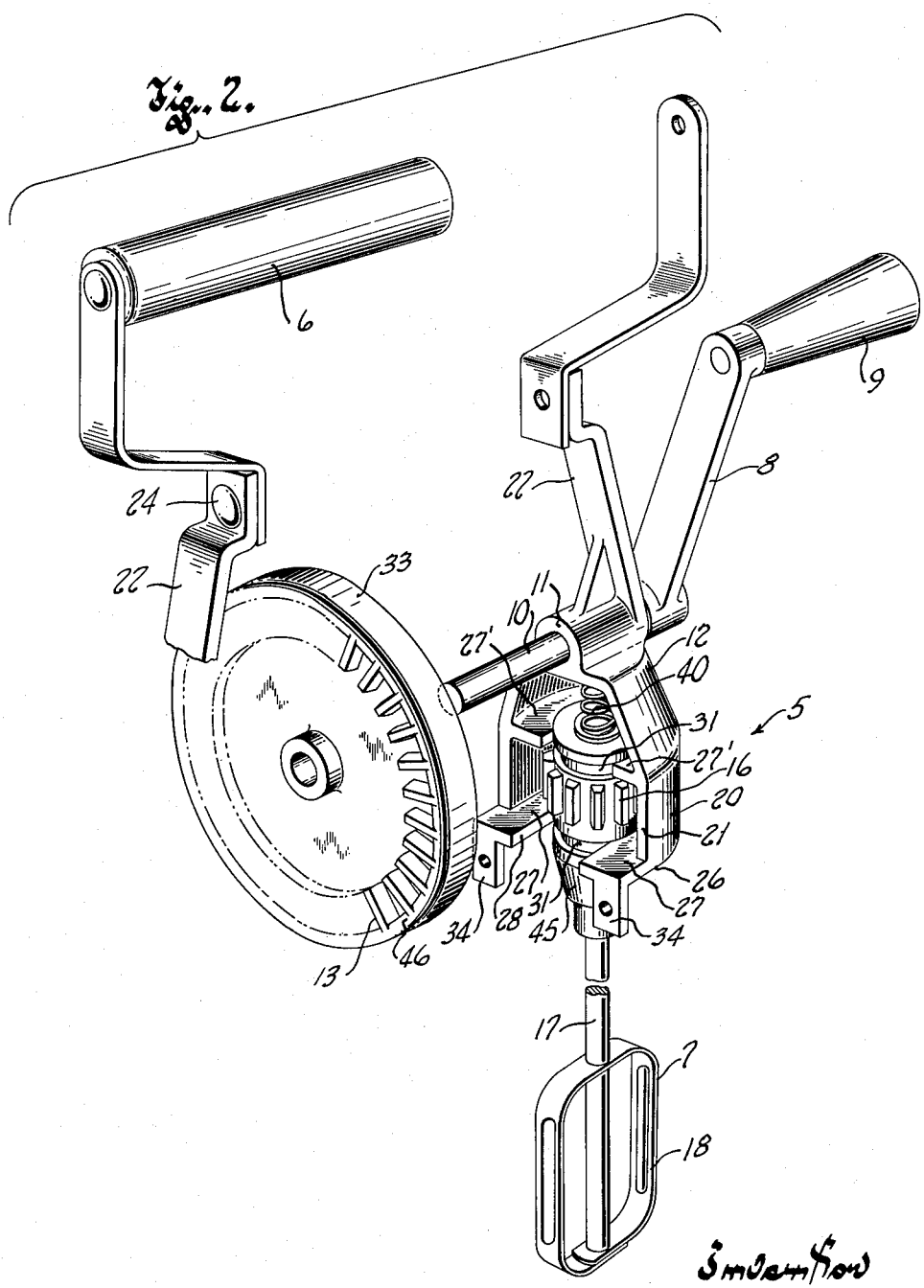

United States Patent Office 2,747,845
Patented May 29, 1956

2,747,845

HOUSEHOLD MIXER WITH AXIALLY YIELDABLE BEATERS

Erich Eugene Kohls, Mequon, and Glenn S. Thompson, Milwaukee, Wis., assignors to John Oster Manufacturing Company, Milwaukee, Wis., a corporation of Wisconsin Application September 16, 1954, Serial No. 456,398

9 Claims. (Cl. 259—131)

This invention relates to mixers of the type which are used for beating and mixing foods and liquids; and like the copending application of Alfred W. Madl, Serial No. 366,977 filed July 9, 1953, now Patent No. 2,699,925 dated January 18, 1955, has as its primary object the provision of a food mixer with axially yieldable beaters.

The purpose, generally, of providing a mixer with axially yieldable beaters is to enable the beater blades to more closely conform to the curved interior surfaces of a mixing bowl as the mixer is manually manipulated in the bowl. Axially yieldable beaters are therefore most advantageously provided on the so-called portable type of food mixers, which are held by an operator during the mixing or beating operations, as distinguished from those mixers which are normally mounted on a pedestal or the like to have their beaters operate in a fixed zone in a mixing bowl supported in a pre-determined position with respect to the beater shafts.

One of the main reasons for the growing popularity of the portable type of food mixer is that it enables the operator to shift or tilt the beaters about in the mixing bowl at will, thereby enabling the beaters to be moved into all areas of the mixing bowl to facilitate the mixing operation, or to dislodge food being mixed from all the surfaces of the bowl interior.

More particularly, it is an object of this invention to provide a household mixer of the character described which is constructed in a manner to achieve axial yieldability of its beaters in a simple manner which assures low manufacturing costs and which, moreover, makes the feature of axially yieldable beaters more practicable for use on portable, manually propelled mixers.

A further object of this invention is to provide a food mixer having beater shafts which are slidable endwise in the bores of their respective driven gears, to provide for axial yielding of the beaters.

Still another object of this invention resides in the provision of a food mixer of the character described wherein the body structure of the mixer is made in complementary laterally adjacent body sections each having a half-bearing in which one of the driven gears is received, and wherein the securement of the body section together with a rim on the drive gear of the mixer engaged between the driven gears and meshing therewith serves to hold the driven gears properly journaled in their bearings.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 1 is an elevational view of the household mixer of this invention, portions thereof being broken away and shown in section;

Figure 2 is an exploded perspective view of the main components of the mixer shown in Figure 1, illustrating the manner of its assembly; and Figure 3 is a cross sectional view taken through Figure 1 along the plane of the line 3—3.

Referring now more particularly to the accompanying drawings, the numeral 5 generally designates the body structure of the mixer. The body structure is normally upright and has a handle 6 secured to its upper portion. Beaters 7 project from the underside of the body structure, and the beaters may be rotated in opposite directions by a crank 8 having an eccentric handle 9 accessible at one side of the body structure. The shaft 10 of the crank has its opposite end portions freely rotatably journaled in bearings 11 on the opposite sides 12 of the body structure, and a drive gear 13 secured to the intermediate portion of the crank shaft 10 has its hub 14 confined between the inner ends of the bosses which provide the bearings 11 to prevent both the gear and the crank shaft from shifting horizontally along the axis of the shaft.

Rotation of the crank is translated into rotation of the beaters in opposite directions by a pair of driven gears 16 rotatably journaled in the lower portion of the body structure, disposed at opposite sides of the drive gear and meshing therewith. The driven gears, in turn, are drivingly connected with the elongated shafts 17 of the beaters 7 to drive the blades 18 on the lower ends of the shafts in opposite directions.

In a general way, the components just described are more or less standard with all food mixers of this type. It will be apparent from the following, however, that the body structure, the driven gears and especially the manner in which the latter are drivingly connected with the beater shafts for endwise motion of the beater shafts relative to the body structure, represents radical departures from the conventional which result in a mixer design of unusual simplicity and compactness.

One of the outstanding features of the mixer of this invention resides in the construction of the body structure 5. It is comprised of two identical cup-like body sections 20 which may be conveniently formed as die castings, if desired. The body sections are arranged at opposite sides of the drive gear 13 with their open sides facing one another. The bottoms of the sections are convexly curved and provide the substantially upright side walls 12 of the body structure. The rims 21 of the cup-like body sections, of course, terminate closely adjacent to the opposite sides of the drive gear.

Converging arms 22 projecting upwardly from the bearings 11 embrace the upper portion of the drive gear and are brought together directly above its periphery and secured as by rivets 24 or the like, with a portion of the handle 6 therebetween to rigidly mount the handle on the body structure.

Inturned flanges on the body sections lying in a common horizontal plane cooperate to provide in effect a bottom wall 26 for the body structure, from which the beaters 7 project. The flanges on each body section are comprised of two side ledges 27, having parallel opposing inner edges 28, and terminating in a semi-circular concave land 29 on the body section remote from its rim 21. At a location nearly midway between the bottom wall 26 and the bearings 11, and hence spaced from the land 29, the body sections are provided with a duplicate set of ledges 27' parallel to the ledges 27 and each terminating in a semi-circular concave land 29' identical to the land 29 and spaced directly thereabove, coaxial therewith.

Each of the driven gears 16 is received in the hollow of one of the cup-like body sections 20 to be rotatably supported by the bearings which the upper and lower lands 29' and 29, respectively, provide. For this purpose each driven gear is provided with axially spaced shallow circumferential grooves 31 to receive the semi-circular concave lands on its body section. The diameter of the grooved portions of the gears, of course, substantially correspond to the distance between the edges 28 of the ledges, and as will be apparent, the concave lands in these grooves extend substantially half-way around the gears to mount the same for rotation about spaced vertical axes and to preclude axial motion of the driven gears relative to the body structure.

The lands provide what may be termed a half-bearing on each body section opening toward its rim and into which its driven gear may be readily inserted before securement of the body sections together in the manner indicated in Figure 2.

The driven gears 16 are maintained in their half-bearings by the drive gear 13. For this purpose the drive gear is formed with a rim-like peripheral portion 33 which engages between the cylindrical hub portions of the driven gears at zones intermediate the axially spaced grooves 31 into which the upper and lower lands project. The rim portion 33 of the drive gear is smooth and has rounded corners, and serves as a guard for the teeth of the drive gear, which teeth project from opposite sides of its web radially inwardly of the rim portion 33.

It will also be noted that the ledges of the body sections which define the bottom wall 26 abut one another on the median vertical plane of the drive gear. Rivets 35 passing through mating flanges 34 on the undersides of the ledges 27 provide for securement of the lower portions of the body sections together.

The beater shafts 17 project upwardly into the body strutcure, and their upper end portions are slidably received and guided in the bores 36 of their respective driven gears. Each of the shafts is drivingly connected to its driven gear by a crosspin 37 having its ends anchored in the hub of the driven gear and its intermediate portion passing diametrically through a longitudinally elongated slot 38 in the upper end portion of the beater shaft. The length of the slot is such as to afford a considerable amount of endwise sliding motion of each beater shaft in the bore of its driven gear, and, of course, the engagement of the crosspin with the ends of the slot determines the limits of axial sliding motion of each beater shaft.

Each of the beater shafts is yieldingly urged to an outwardly projected position at which the upper end of its slot 38 engages the crosspin 37. A pair of coiled compression springs 40, each bearing upon the upper end of one of the shafts, is provided for this purpose. The lower end portion of each spring is received in an upwardly opening well 41 in its beater shaft and bears against the bottom of the well. The upper end portions of the springs are received in shallow wells 43 in the undersides of the bearing bosses 11 for the crank shaft.

The purpose of providing the wells 41 in the upper ends of the beater shafts is to conserve space; and if desired, the upper end portions of the beater shafts may be of tubular construction, as shown, having the lower portions of the beater shafts welded thereto at locations beneath the body structure. In this latter event, of course, the wells 41 into which the lower ends of the springs 40 project are actually counterbores which cooperate with the wells 43 on the body structure to hold the compression springs 40 coaxial with the beater shafts.

The particular arrangement of the driven gears and their beaters described provides a unique splined connection between the shafts and their gears whereby the driven gears are journaled on the body structure by half-bearings engaging external surfaces of the gears, and wherein the bores of the gears provide guides for the axially yieldable beater shafts.

The slots 38 for the drive pins extend downwardly a substantial distance to provide sufficient axial yieldability for the beaters. Actually, these slots extend beneath the bottom wall of the body structure, and foods or liquids being mixed might ordinarily tend to collect in the slots, and more particularly the hollow interiors of the tubular upper end portions of the beater shafts. In the present construction, this is prevented by having hub portions of the driven gears project downwardly from the underside of the body structure beyond the slotted portions of the beater shafts as at 45.

Inasmuch as the rim 33 of the drive gear engages the cylindrical hubs of both driven gears, being interposed therebetween to hold them in their half-bearings, the opposite faces of the rim are preferably given a rounded or convex configuration as seen at 46, to minimize friction resulting from such engagement with the driven gears.

From the foregoing description together with the accompanying drawings, it will be apparent to those skilled in the art that this invention provides axially yieldable beaters, which, by reason of the simplicity and low cost of their construction, are especially well adapted for use on the manually driven type of household mixer.

What we claim as our invention is:

1. An egg beater type mixer comprising: a body structure; a pair of driven gears each having a bore; bearing means on the body structure mounting said driven gears on the body structure for rotation on spaced apart parallel axes and preventing axial motion of the gears relative to the body structure; a drive gear carried by the body structure; bearings on the body structure rotatably mounting the drive gear with a portion disposed between said driven gears and meshing therewith to impart rotation in opposite directions to the driven gears; a pair of elongated beater shafts each having beater blades on one end portion and having its opposite end portion slidably received in the bore of one of said driven gears to be guided thereby for motion relative to the body structure in opposite axial directions; a driving connection between each driven gear and the end portion of the beater shaft in its bore, said driving connection constraining the beater shaft to rotation with its driven gear without interfering with a substantial degree of endwise motion of the beater shaft in the bore of its driven gear, relative to the body structure; means for limiting end-wise motion of the shafts in a direction outwardly of the body structure; and means for normally yieldingly holding each shaft at its outward limit of motion comprising a spring in the body structure extending between the bearings for the drive gear and each driven gear and acting upon the adjacent end portion of the beater shaft therein.

2. The mixer set forth in claim 1 wherein each shaft has a tubular inner end portion slidably received in the bore of its driven gear; and wherein each shaft has a counterbore in its inner extremity into which one end portion of its spring projects, the bottom of the well providing a shoulder against which the spring acts.

3. The mixer set forth in claim 2 further characterized by the fact that the driving connection between each driven gear and the tubular end portion of the beater shaft in its bore comprises a pin having its opposite end portions anchored in the walls of the driven gear and its intermediate portion extending across the bore of the gear and through diametrically opposite longitudinally elongated slots in the tubular portion of the beater shaft to drivingly couple the shaft to the gear and at the same time provide for a substantial degree of endwise sliding motion of the shaft relative to its gear.

4. An egg beater type mixer comprising: a body structure; a pair of driven gears each having a bore; bearing means on the body structure mounting the driven gears thereon for rotation on spaced apart parallel axes, said bearing means including spaced apart semi-circular concave lands facing one another, each of said concave lands being engaged in a circumferential groove in the exterior of the adjacent gear to prevent axial motion thereof relative to the body structure; a drive gear rotatably mounted on the body structure with a portion thereof confined between said driven gears to hold the grooved portions of the driven gears engaged with said concave lands, and meshing with the driven gears to impart rotation in opposite directions to the driven gears; a pair of elongated beater shafts each having beater blades at one end and having its opposite end portion slidably received in the bore of one of said driven gears to be guided thereby for a substantial amount of axial motion relative to the body structure; a driving connection between each driven gear and the beater shaft in its bore, said driving connections constraining the shafts to rotate with the driven gears without interfering with endwise motion of the beater shafts relative to the body structure; cooperating means on the body structure and said shafts for limiting endwise motion of the shafts in a direction outwardly of the body structure; and spring means in the body structure acting upon the shafts to yieldingly resist endwise motion of the shafts inwardly of the body structure, said spring means normally holding the shafts at their outward limits of motion.

5. The mixer set forth in claim 4 wherein each of said driven gears is provided with a pair of axially spaced circumferential grooves in its periphery and gear teeth encircling the exterior of the gear at a location between said grooves; and wherein said bearing means for the driven gears comprises spaced semi-circular concave lands engaging in the axially spaced grooves of each driven gear and extending substantially one-half way around the grooved periphery of the gears at a location remote from the drive gear; and means on the drive gear engaged with the peripheries of the driven gears for holding the latter properly on said lands.

6. In an egg beater type mixer: a body structure; a pair of driven gears carried by the body structure; a beater carried by each driven gear and connected thereto to rotate therewith; a drive gear rotatably mounted on the body structure with a rim portion interposed between and engaged with cylindrical surfaces on said driven gears, said drive gear meshing with both of said driven gears; and bearing means on the body structure having limited engagement with said driven gears from the sides thereof remote from the drive gear and cooperating with said rim portion of the drive gear to constrain the driven gears to rotary motion about fixed parallel axes.

7. The egg beater type mixer set forth in claim 6 wherein the bearing means for each driven gear comprises spaced semi-circular concave lands on the body structure engaged in axially spaced circumferential grooves on said driven gear and lying at opposite sides of a plane normal to the axes of the driven gears and containing the points of engagement between the rim portion of the drive gear and the cylindrical surfaces of the driven gears.

8. The egg beater type mixer set forth in claim 7 further characterized by the fact that the body structure comprises complementary laterally adjacent body sections each having bearing means for one of said driven gears; and means securing said body sections together.

9. In an egg beater type mixer: a substantially upright body structure comprising complementary laterally adjacent body sections secured together at the top and bottom of said body structure; a handle carried by the body structure at the top thereof; a bearing on each body section, said bearings being coaxial; a driving gear rotatably supported by said bearings, between the body sections; a pair of driven gears carried by the body structure, each in the lower portion of one of said body sections, at one side of the drive gear and meshing therewith; means on said complementary body sections defining opposing half-bearings at opposite sides of and opening toward the drive gear, said last named means including semi-circular concave lands on each body section; and said driven gears being rotatably received in said half-bearings with said lands projecting into circumferential grooves in the peripheries of the gears to rotatably mount the driven gears on the body structure for rotation on spaced vertical axes and to prevent axial motion of the driven gears relative to the body structure; a rim portion on said drive gear extending between the driven gears and engaged therewith to hold the same in their half-bearings; and a beater shaft connected to each of said driven gears and extending downwardly from the bottom of the body structure, each of said beater shafts having beater blades on its lower end portion.

References Cited in the file of this patent
UNITED STATES PATENTS

| | | |
|---|---|---|
| 356,694 | Morey | Jan. 25, 1887 |
| 1,898,094 | Nies | Feb. 21, 1933 |
| 2,468,182 | Dempsey | Apr. 26, 1949 |
| 2,505,362 | Lawrence | Apr. 25, 1950 |